(12) United States Patent
Hitchcock et al.

(10) Patent No.: US 12,431,654 B2
(45) Date of Patent: Sep. 30, 2025

(54) TERMINAL COVERS FOR TERMINALS OF CHARGING INLET ASSEMBLY

(71) Applicant: TE Connectivity Solutions GmbH, Schaffhausen (CH)

(72) Inventors: Matthew Bryan Hitchcock, Hershey, PA (US); Kevin John Peterson, Kernersville, NC (US); Clara Marguerite Rhodes, Winston Salem, NC (US); Aaron James de Chazal, Rochester, MI (US)

(73) Assignee: TE Connectivity Solutions GmbH (CH)

( * ) Notice: Subject to any disclaimer, the term of this patent is extended or adjusted under 35 U.S.C. 154(b) by 390 days.

(21) Appl. No.: 18/076,524

(22) Filed: Dec. 7, 2022

(65) Prior Publication Data

US 2024/0195105 A1 Jun. 13, 2024

(51) Int. Cl.
| | |
|---|---|
| *H01R 13/42* | (2006.01) |
| *B60L 53/16* | (2019.01) |
| *H01R 13/52* | (2006.01) |
| *H01R 13/627* | (2006.01) |
| *H01R 13/641* | (2006.01) |

(52) U.S. Cl.
CPC ............. *H01R 13/42* (2013.01); *B60L 53/16* (2019.02); *H01R 13/5213* (2013.01); *H01R 13/6271* (2013.01); *H01R 13/641* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 8,678,846 B2 | 3/2014 | Hitchcock et al. | |
| 10,675,988 B2* | 6/2020 | Fuehrer | B60L 53/16 |
| 11,285,832 B2* | 3/2022 | Rhodes | H01R 13/502 |
| 11,752,888 B2* | 9/2023 | Luo | B60L 53/16 |
| | | | 439/34 |
| 11,975,622 B2* | 5/2024 | Rhodes | H01R 13/516 |
| 12,054,106 B2* | 8/2024 | Hitchcock | B60R 16/0215 |
| 12,109,902 B2* | 10/2024 | Hitchcock | H01R 24/86 |
| 12,212,094 B2* | 1/2025 | Yamaguchi | H01R 13/512 |
| 2019/0135131 A1* | 5/2019 | Wenz | H01R 4/308 |
| 2019/0217730 A1* | 7/2019 | Götz | H01R 13/506 |
| 2019/0334293 A1* | 10/2019 | Iwami | B60L 53/16 |
| 2020/0067237 A1* | 2/2020 | Sarraf | G01K 1/18 |
| 2020/0381874 A1* | 12/2020 | Rose | H01R 13/6683 |
| 2022/0006229 A1* | 1/2022 | Carlson | H01R 13/631 |
| 2022/0234455 A1* | 7/2022 | Fuehrer | B60L 53/302 |
| 2022/0324342 A1* | 10/2022 | Ke | H01R 13/5816 |

(Continued)

*Primary Examiner* — Ross N Gushi

(57) ABSTRACT

A terminal assembly for a charging inlet assembly includes a terminal cable having a conductor. The terminal assembly includes a terminal having a pin at a mating end and a terminating end opposite the mating end terminated to the conductor at an end of the terminal cable. The terminal assembly includes a terminal cover having a cover body including a bore that receives the terminating end of the terminal and the end of the terminal cable. The terminal cover includes a latch configured to secure the terminal and the terminal cable to a housing of the charging inlet assembly. The terminal cover includes a terminal cover seal configured to be sealed to the housing of the charging inlet assembly.

20 Claims, 5 Drawing Sheets

(56) References Cited

U.S. PATENT DOCUMENTS

| | | | | |
|---|---|---|---|---|
| 2022/0376525 A1* | 11/2022 | Fuehrer | ............... | H02J 7/00714 |
| 2023/0059653 A1* | 2/2023 | Hitchcock | ............... | B60L 53/16 |
| 2024/0195105 A1* | 6/2024 | Hitchcock | ............ | H01R 13/641 |
| 2024/0351457 A1* | 10/2024 | Venkatesan | ............ | H01R 13/04 |
| 2025/0026211 A1* | 1/2025 | Peterson | ................ | B60L 53/16 |

* cited by examiner

TERMINAL COVERS FOR TERMINALS OF CHARGING INLET ASSEMBLY

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The terminals are typically retained in terminal channels of the inlet housing using internal latching features that interface directly with the terminals. Removal of the terminals from the inlet housing is difficult. Additionally, the latching features increase the overall lengths of the terminal channels and the terminals, causing an increased profile or depth of the charging inlet assembly.

A need remains for an improved charging inlet assembly.

BRIEF DESCRIPTION OF THE INVENTION

In one embodiment, a terminal assembly for a charging inlet assembly is provided. The terminal assembly includes a terminal cable having a conductor. The terminal assembly includes a terminal having a pin at a mating end and a terminating end opposite the mating end terminated to the conductor at an end of the terminal cable. The terminal assembly includes a terminal cover having a cover body including a bore that receives the terminating end of the terminal and the end of the terminal cable. The terminal cover includes a latch configured to secure the terminal and the terminal cable to a housing of the charging inlet assembly. The terminal cover includes a terminal cover seal configured to be sealed to the housing of the charging inlet assembly.

In another embodiment, a charging inlet assembly is provided and includes a housing extending between a front and a rear. The housing has a DC section including DC terminal channels. The housing has an AC section including AC terminal channels. The DC section configured for mating with a DC charging connector at the front. The AC section configured for mating with an AC charging connector at the front. The housing includes a rear cavity at the rear. The charging inlet assembly includes DC terminals received in the corresponding DC terminal channels for mating with the DC charging connector. The charging inlet assembly includes AC terminals received in the corresponding AC terminal channels. Each AC terminal includes a pin at a mating end for mating with the AC charging connector. Each AC terminal includes a terminating end opposite the mating end terminated to a conductor at an end of a terminal cable. The charging inlet assembly includes terminal covers coupled to the AC terminals. Each terminal cover has a cover body includes a bore that receives the terminating end of the corresponding terminal and the end of the corresponding terminal cable. The terminal cover includes a latch coupled to the rear of the housing to secure the terminal and the terminal cable to the housing. The terminal cover includes a terminal cover seal sealed to the housing.

In a further embodiment, a charging inlet assembly is provided and includes a housing extending between a front and a rear. The housing has a DC section including DC terminal channels. The housing has an AC section includes AC terminal channels. The DC section configured for mating with a DC charging connector at the front. The AC section configured for mating with an AC charging connector at the front. The housing includes a rear cavity at the rear. DC terminals are received in the corresponding DC terminal channels for mating with the DC charging connector. AC terminals are received in the corresponding AC terminal channels. Each AC terminal includes a pin at a mating end for mating with the AC charging connector. Each AC terminal includes a terminating end opposite the mating end terminated to a conductor at an end of a terminal cable. The charging inlet assembly includes terminal covers coupled to the AC terminals. Each terminal cover has a cover body including a bore that receives the terminating end of the corresponding terminal and the end of the corresponding terminal cable. The terminal cover includes a latch coupled to the rear of the housing to secure the terminal and the terminal cable to the housing. The terminal cover includes a terminal position assurance (TPA) device operably coupled to the latch and movable between a retracted position and an advanced position. The TPA device assuring the latch is fully latched to the housing when the TPA device is moved to the advanced position. The terminal cover includes a terminal cover seal sealed to the housing.

DETAILED DESCRIPTION OF THE INVENTION

Figure 1:
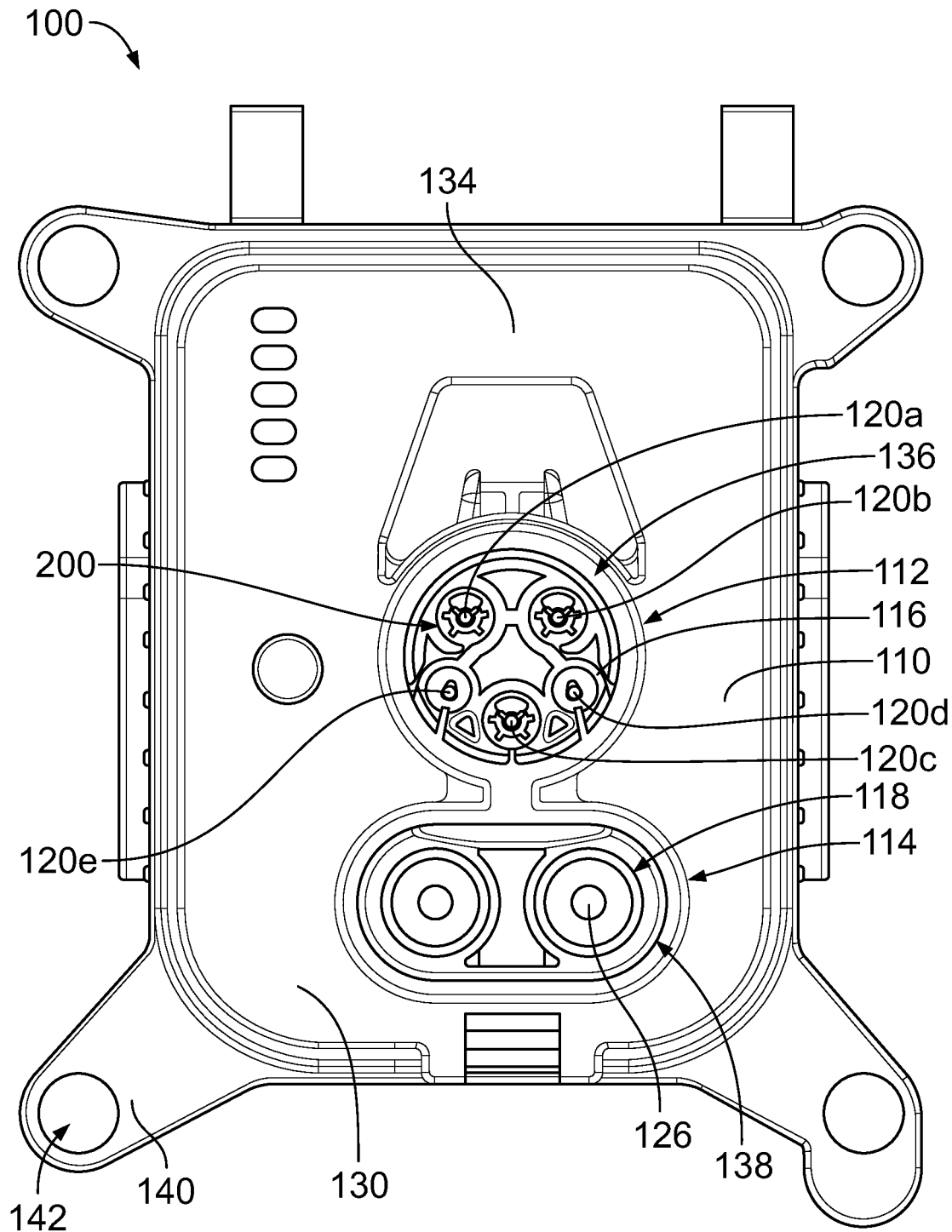
FIG. 1 is a front view of a charging inlet assembly 100 including an AC charging module and a DC charging module in accordance with an exemplary embodiment.
Figure 2:
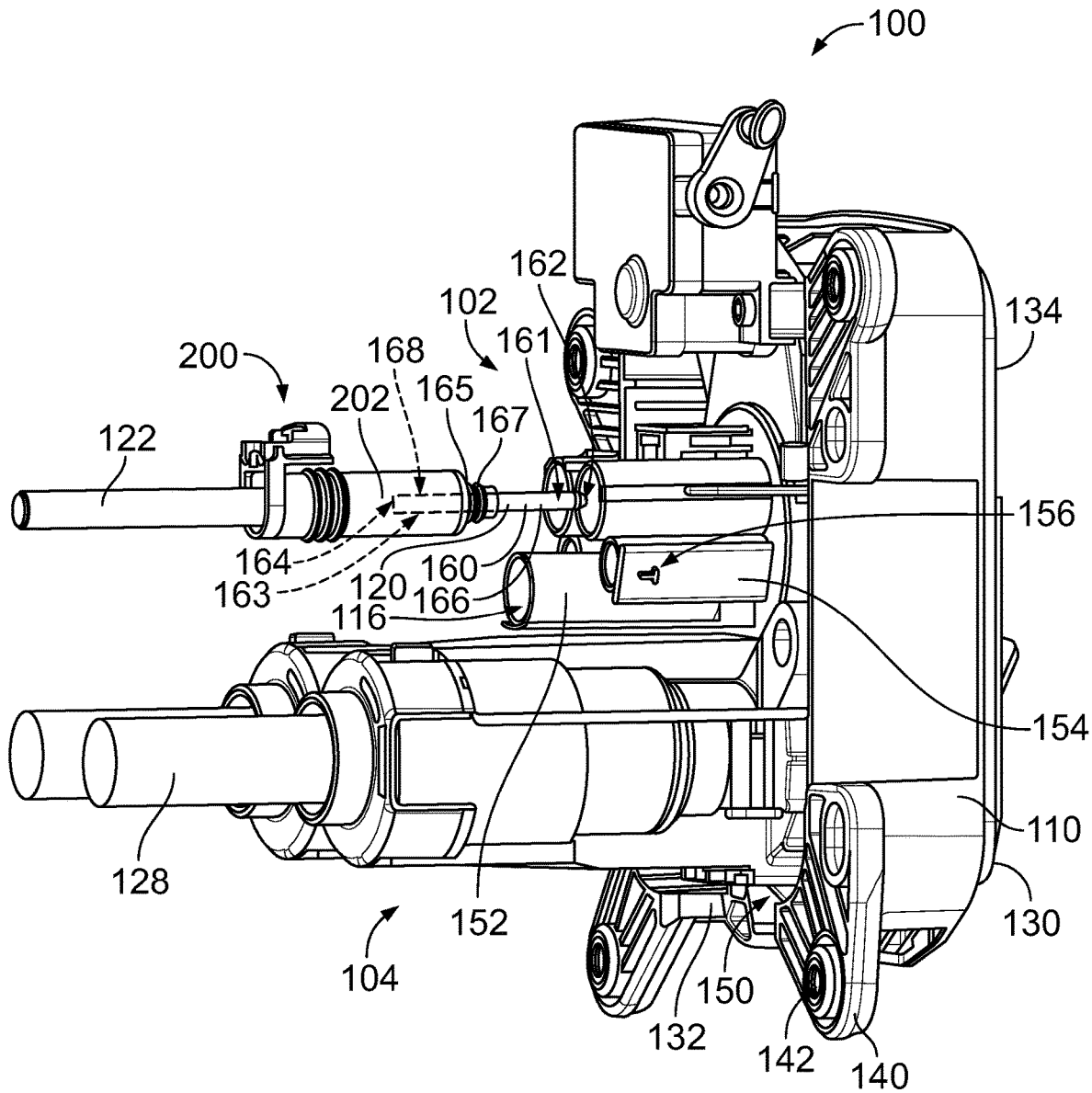
FIG. 2 is a rear perspective view of the charging inlet assembly showing a portion of the AC charging module and the DC charging module in accordance with an exemplary embodiment.

FIG. 1 is a front view of a charging inlet assembly 100 including an AC charging module 102 and a DC charging module 104 in accordance with an exemplary embodiment. FIG. 2 is a rear perspective view of the charging inlet assembly 100 showing a portion of the AC charging module 102 and the DC charging module 104 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The charging inlet assembly 100 includes AC terminal assemblies 200 at the AC section 112. Each AC terminal assembly 200 includes an AC terminal 120, an AC cable 122, and a terminal cover 202 coupled to the AC terminal 120 and the AC cable 122. The AC terminal assemblies 200 are held by the housing 110. The AC terminals 120 are received in corresponding AC terminal channels 116. In various embodiments, the AC terminals 120 of the AC charging module 102 are individually coupled to the housing 110. In other various embodiments, multiple AC terminals 120 may be coupled to the housing 110 as a unit, such as using a common housing or mounting structure. In the illustrated embodiment, five AC terminals 120 are provided, including a first AC charging terminal 120*a*, a second AC charging terminal 120*b*, a ground terminal 120*c*, a proximity terminal 120*d*, and a pilot terminal 120*e*. Optionally, the AC terminals 120 may be different sized terminals. In an exemplary embodiment, the AC terminals 120 include pins at mating ends of the AC terminals 120. The AC cables 122 are terminated to the AC terminals 120 and extend from the charging inlet assembly 100 to another component of the vehicle, such as the battery system of the vehicle. The AC terminals 120 are configured to be mated to the charging connector.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be a socket connector configured to receive the charging plug. Seals may be provided at the interface of the low-voltage connector.

The charging inlet assembly 100 includes DC terminals 126 at the DC section 114. The DC terminals 126 are held by the housing 110. The DC terminals 126 are received in corresponding DC terminal channels 118. In various embodiments, the DC terminals 126 may be part of the DC charging module 104 that is coupled to the housing 110. In the illustrated embodiment, two DC terminals 126 are provided. In an exemplary embodiment, the DC terminals 126 include pins at mating ends of the DC terminals 126. DC cables 128 are terminated to the DC terminals 126 and extend from the charging inlet assembly 100 to another component of the vehicle, such as the battery system of the vehicle. The DC terminals 126 are configured to be mated to the charging connector.

In an exemplary embodiment, the DC section 114 of the charging inlet assembly 100 defines a high-voltage connector configured to be coupled to the high-voltage portion of the charging connector. The high-voltage connector (for example, the DC terminals 126 and the DC cables 128) is configured to be coupled to other components in the system, such as the battery and/or the battery distribution unit of the vehicle. The high-voltage connector is used for fast charging of the battery. The high-voltage connector may be a socket connector configured to receive the charging plug. Seals may be provided at the interface of the high-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. In an exemplary embodiment, the housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 126 that receive the charging connector. The DC charging connector is configured to be plugged into the DC socket 138. During charging, the DC charging connector is plugged into the DC socket 138 to electrically connect to the DC terminals 126. The panel 134 may surround the AC socket 136 and the DC socket 138 at the front 130.

In an exemplary embodiment, the housing 110 includes a rear cavity 150 at the rear 132. In the illustrated embodiment, the rear cavity 150 is provided at the DC section 114. The rear cavity 150 receives the DC module 104. The rear cavity 150 may additionally receive the AC module 102.

In an exemplary embodiment, the housing 110 includes mounting tabs 140 used for mounting the housing 110 to the vehicle. The mounting tabs 140 have openings 142 that receive fasteners (not shown) to secure the charging inlet assembly 100 to the vehicle. Other types of mounting features may be used to secure the charging inlet assembly 100 to the vehicle. In various embodiments, the charging inlet assembly 100 may include a mounting flange (not shown) coupled to the front of the housing 110 for mounting the charging inlet assembly 100 to the vehicle. The housing 110 and/or the mounting flange may include a seal (not shown) to seal the charging inlet assembly 100 to the vehicle. In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

With reference to FIG. 2, FIG. 2 shows one of the AC terminal assemblies 200 configured to be loaded into silos 152 at the rear 132 of the housing 110. The silos 152 define portions of the AC terminal channels 116. The AC terminals 120 are pluggable into the silos 152 through the rear 132. Portions of the terminal covers 202 are pluggable into the silos 152 through the rear 132. In an exemplary embodiment, each silo 152 includes a latching shoulder 154 extending along an exterior portion of the silo 152. The latching shoulder 154 may be planar, such as to receive a portion of the AC terminal assembly 200. For example, the terminal cover 202 is coupled to the latching shoulder 154. In an exemplary embodiment, the silo 152 includes a latching feature 156 at an exterior of the silo 152. Optionally, the latching feature 156 may be located at the latching shoulder 154. The terminal cover 202 is latchably coupled to the latching feature 156 and may be released for servicing the terminal assembly 200, such as to repair or replace the terminal 120. In the illustrated embodiment, the latching feature 156 is a tab, a catch or other protrusion extending outward from the silo 152. Other types of latching features may be used in alternative embodiments, such as deflectable latching beams, clips, and catch window on a deflectable tab, and the like.

Each AC terminal 120 includes a main body 160 extending between a mating end 162 and a terminating end 164 (shown in phantom). The AC terminal 120 includes a flange 165 between a forward portion 161, at the mating end 162, and a rearward portion 163 (shown in phantom), at the terminating end 164. The flange 165 may be approximately centered between the forward portion 161 and the rearward portion 163. In an exemplary embodiment, a terminal seal 167 is coupled to the main body 160, such as along the forward portion 161. The terminal seal 167 may be located immediately forward of the flange 165. The terminal seal 167 is configured to be sealed to the housing 110 when the AC terminal 120 is received in the AC terminal channel 116. For example, the terminal seal 167 may be plugged into the silo 152 to interface with the housing 110 within the AC terminal channel 116. The AC terminal 120 includes a mating pin 166 at the forward portion 161 extending to the mating end 162. The mating pin 166 is presented at the front 130 of the housing 110 for mating with the charging connector. The AC terminal 120 includes a post 168 at the rearward portion 163 extending to the terminating end 164. The terminating end 164 is configured to be electrically connected to the AC cables 122. The terminating end 164 may include a weld pad or a crimp barrel.

Figure 3:
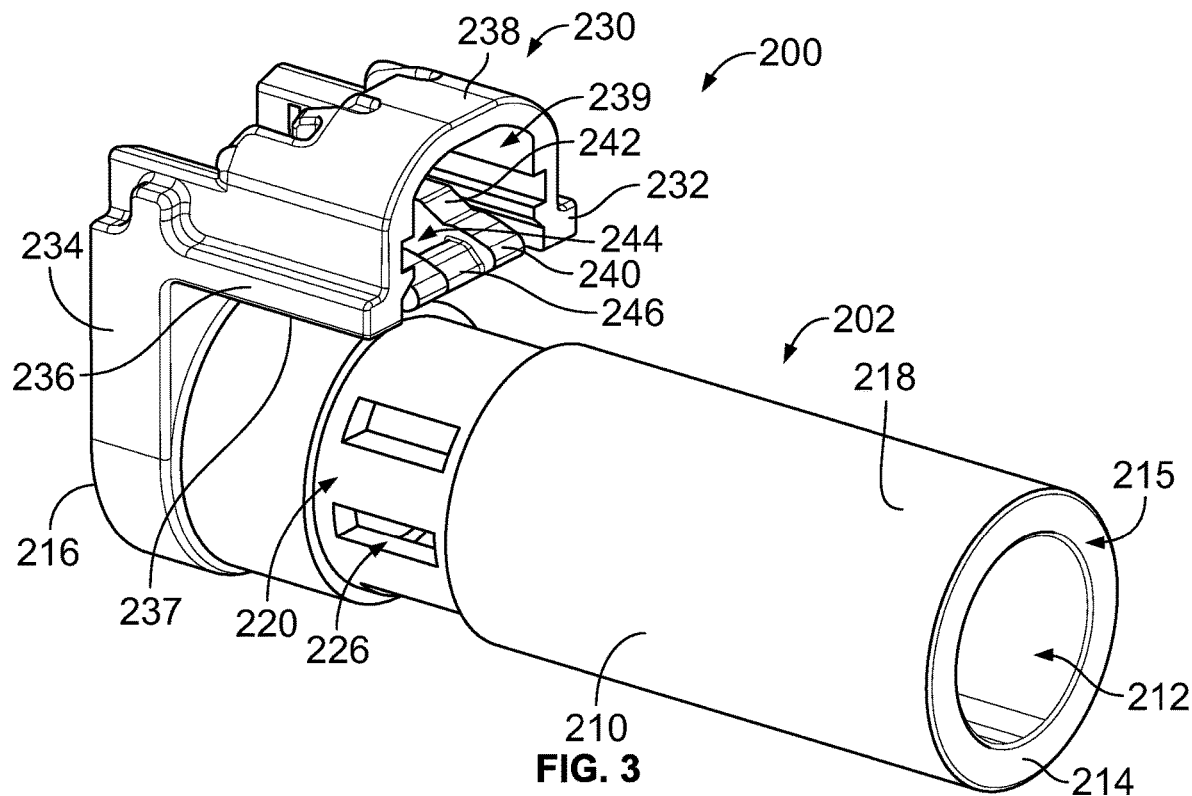
FIG. 3 is a front perspective view of a portion of the terminal cover of the terminal assembly in accordance with an exemplary embodiment.
Figure 4:
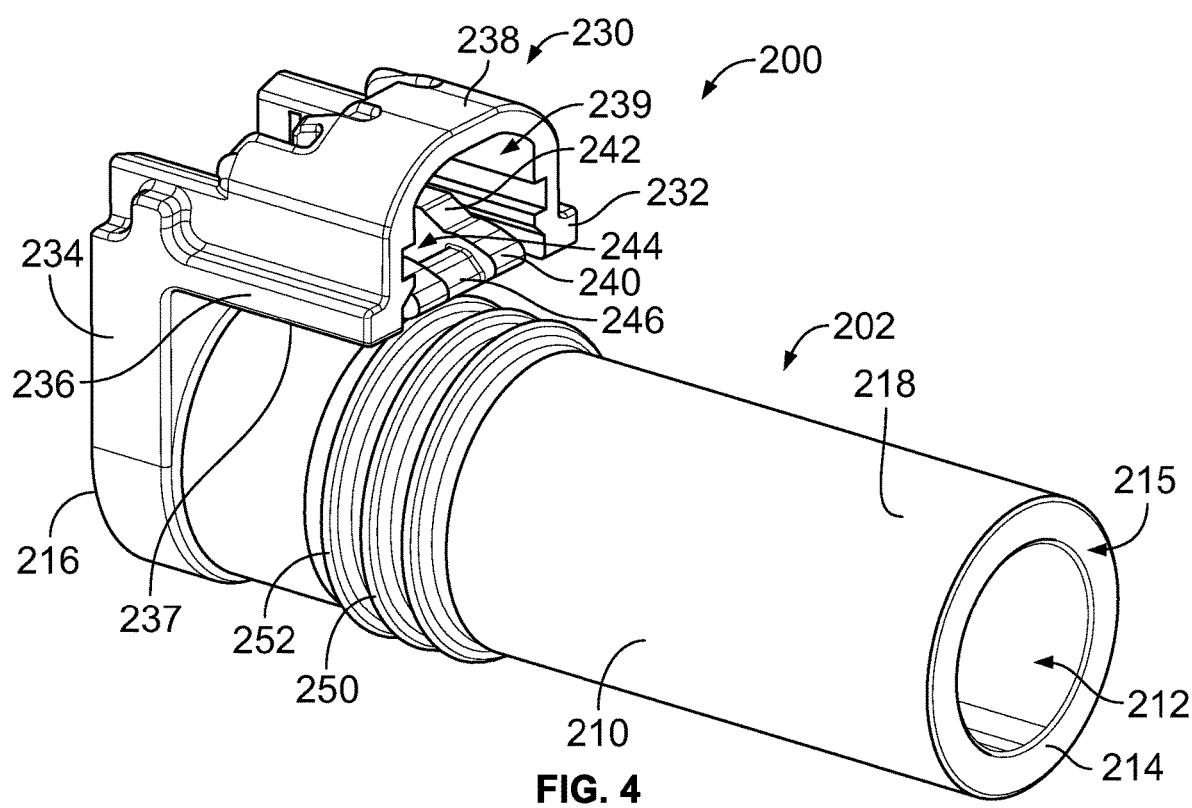
FIG. 4 is a front perspective view of the terminal cover of the terminal assembly in accordance with an exemplary embodiment.
Figure 5:
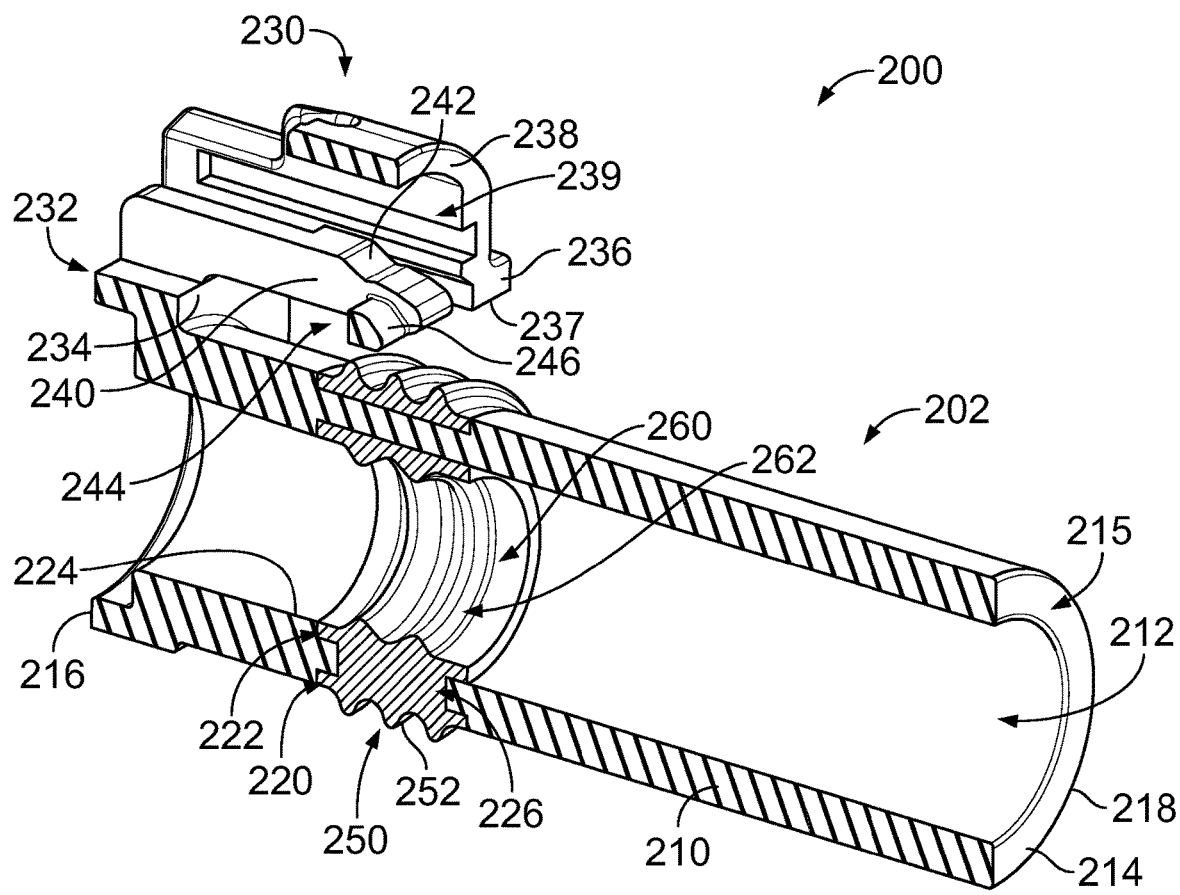
FIG. 5 is a cross-sectional view of the terminal cover of the terminal assembly in accordance with an exemplary embodiment.

FIG. 3 is a front perspective view of a portion of the terminal cover 202 of the terminal assembly 200 in accordance with an exemplary embodiment. FIG. 4 is a front perspective view of the terminal cover 202 of the terminal assembly 200 in accordance with an exemplary embodiment. FIG. 5 is a cross-sectional view of the terminal cover 202 of the terminal assembly 200 in accordance with an exemplary embodiment.

The terminal cover 202 includes a cover body 210 including a bore 212 that receives the terminating end 164 of the terminal 120 (shown in FIG. 2) and the end of the terminal cable 122 (shown in FIG. 2). The terminal cover 202 includes a latch 230 configured to secure the terminal 120 and the terminal cable 122 to the housing 110 (shown in FIG. 2) of the charging inlet assembly 100. The terminal cover 202 includes a terminal cover seal 250 configured to be sealed to the housing 110 of the charging inlet assembly 100. The terminal cover 202 includes a cable seal 260 configured to be sealed to the terminal cable 122.

The cover body 210 is manufactured from a dielectric material, such as a plastic material. In an exemplary embodiment, the cover body 210 is molded, such as being injection molded. The cover body 210 extends between a front 214 and a rear 216. In an exemplary embodiment, the cover body 210 is cylindrical having an outer surface 218. In an exemplary embodiment, the cover body 210 of the terminal cover 202 includes a terminal blocking surface 215. The terminal blocking surface 215 is configured to be coupled to the terminal 120 to axially fix the terminal 120 to the terminal cover 202. In the illustrated embodiment, the terminal blocking surface 215 is provided at the front 214. The front edge of the cylindrical cover body 210 defines the terminal blocking surface 215. The terminal blocking surface 215 is configured to engage the flange 165 to position the terminal 120 relative to the terminal cover 202. The terminal blocking surface 215 may be provided at other locations in alternative embodiments. The terminal blocking surface 215 may be defined by other features, such as a tab or extensions.

The cover body 210 includes an outer seal groove 220 formed in the outer surface 218 and/or an inner seal groove 222 formed in an inner surface 224. The terminal cover seal 250 is received in the outer seal groove 220. The cable seal 260 is received in the inner seal groove 222. In an exemplary embodiment, the cover body 210 includes seal channels 226 through the cover body 210 between the outer seal groove 220 and the inner seal groove 222. In an exemplary embodiment, the terminal cover seal 250 and the cable seal 260 are co-molded with each other in situ on the cover body 210. The molding material flows through the seal channels 226 to form the terminal cover seal 250 and the cable seal 260. The terminal cover seal 250 is sealed to the outer surface 218, such as in the outer seal groove 220. The terminal cover seal 250 includes sealing ribs 252 configured to be sealed against the housing 110, such as in the silos 152. The cable seal 260 is sealed to the inner surface 224, such as in the inner seal groove 222. The cable seal 260 includes sealing ribs 262 configured to be sealed to the cable 122.

The latch 230 extends from the cover body 210. In an exemplary embodiment, the latch 230 is integral with the cover body 210, such as being a unitary, monolithic structure. In various embodiments, the latch 230 may be co-molded with the cover body 210. In an exemplary embodiment, the latch 230 includes a latch block 232 and a latching finger 240 extending from the latch block 232.

The latch block 232 includes an extension 234 extending from the cover body 210 and a base 236 extending from the extension 234. The latch block 232 may extend from a top of the cover body 210; however, the latch block 232 may extend from other sides of the cover body 210 in alternative embodiments. In the illustrated embodiment, the extension 234 is provided at the rear 216 of the cover body 210; however, the extension 234 may extend from other portions of the cover body 210. The base 236 extends forward of the extension 234. In an exemplary embodiment, the base 236 includes a locating surface 237. The locating surface 237 is used to position the terminal cover 202 relative to the housing 110. In various embodiments, the locating surface 237 is planar. In an exemplary embodiment, the locating surface 237 is configured to engage the latching shoulder 154 of the housing 110. The locating surface 237 may prevent rotation of the terminal cover 202 relative to the housing 110. In an exemplary embodiment, the latch block 232 includes a hood 238 extending from the base 236. The hood 238 forms a pocket 239 above the base 236 and the latching finger 240.

The latching finger 240 is used to latchably couple the terminal cover 202 to the housing 110. For example, the latching finger 240 may be latchably coupled to the latching feature 156 of the housing 110. The latching finger 240 is deflectable. The latching finger 240 may be released from the latching feature 156. In an exemplary embodiment, the latching finger 240 includes beams 242 extending along an opening 244. The opening receives the latching feature 156. A connecting member 246 is located forward of the opening 244. The connecting member 246 engages the latching feature 156 to latchably secure the latching finger 240, and thus the terminal cover 202, to the latching feature 156, and thus the housing 110.

Figure 6:
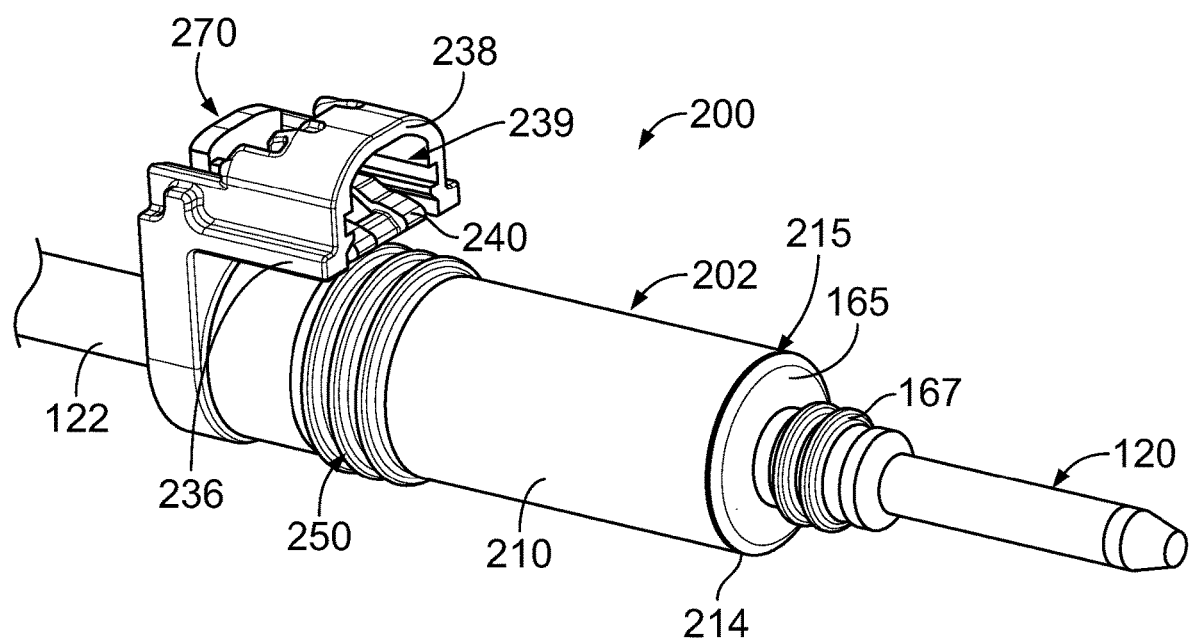
FIG. 6 is a front perspective view of the terminal assembly in accordance with an exemplary embodiment.

FIG. 6 is a front perspective view of the terminal assembly 200 in accordance with an exemplary embodiment. The terminal assembly 200 includes the AC terminal 120, the AC cable 122 terminated to the AC terminal 120, and the terminal cover 202 coupled to the AC terminal 120 and the AC cable 122. The AC terminal 120 and the AC cable 122 are received in the bore 212. The terminal cover 202 provides strain relief for the AC cable 122. In an exemplary embodiment, the flange 165 of the AC terminal 120 abuts against the terminal blocking surface 215 at the front 214 of the cover body 210 to position the AC terminal 120 relative to the terminal cover 202. The terminal blocking surface 215 holds the axial position of the terminal cover 202 relative to the AC terminal 120. The terminal seal 167 of the AC terminal 120 is located forward of the flange 165 for sealing to the housing 110 (shown in FIG. 2). The terminal cover seal 250 is provided at the exterior of the cover body 210 to seal the terminal cover 202 to the housing 110.

In an exemplary embodiment, the terminal assembly 200 includes a terminal position assurance (TPA) device 270 coupled to the terminal cover 202. The TPA device 270 is used to assure that the terminal assembly 200 is properly and fully mated with the housing 110. The TPA device 270 may be used as a secondary lock, such as to lock the latching finger 240 in a latched position. In an exemplary embodiment, the TPA device 270 is received in the pocket 239 and is at least partially surrounded by the hood 238. The TPA device 270 may be slidably coupled to the base 236 and movable between a retracted position and an advanced position.

Figure 7:
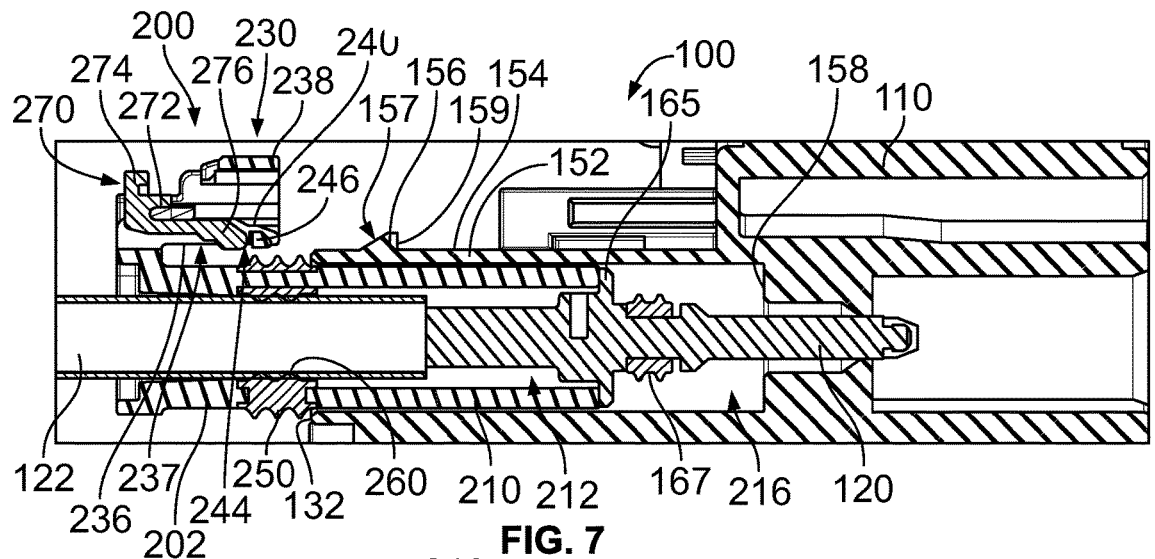
FIG. 7 is a cross sectional view of a portion of the charging inlet assembly showing one of the terminal assemblies partially coupled to the housing in accordance with an exemplary embodiment.
Figure 8:
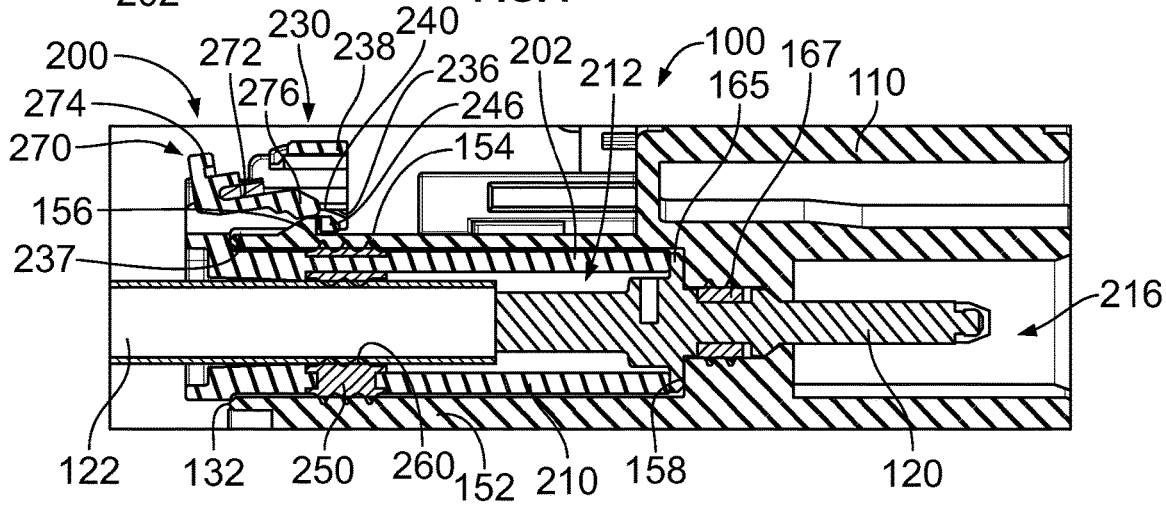
FIG. 8 is a cross sectional view of a portion of the charging inlet assembly showing one of the terminal assemblies fully coupled to the housing in an unlocked state in accordance with an exemplary embodiment.
Figure 9:
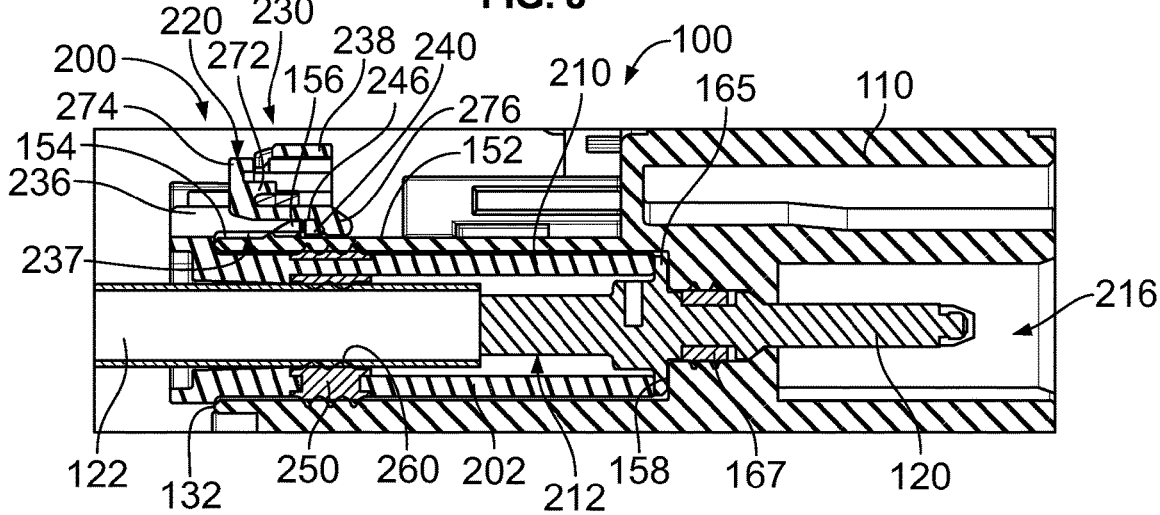
FIG. 9 is a cross sectional view of a portion of the charging inlet assembly showing one of the terminal assemblies fully coupled to the housing in a locked state in accordance with an exemplary embodiment.

FIG. 7 is a cross sectional view of a portion of the charging inlet assembly 100 showing one of the terminal assemblies 200 partially coupled to the housing 110. FIG. 8 is a cross sectional view of a portion of the charging inlet assembly 100 showing one of the terminal assemblies 200 fully coupled to the housing 110 in an unlocked state. FIG. 9 is a cross sectional view of a portion of the charging inlet assembly 100 showing one of the terminal assemblies 200 fully coupled to the housing 110 in a locked state.

The housing 110 includes the terminal channels 116 that receive the terminal assembly 200. The housing 110 includes the silos 152 at the rear 132 of the housing 110, which define portions of the terminal channels 116. The terminal assemblies 200 are loaded into the silos 152 through the rear 132 of the housing 110. The front portions of the terminal covers 202 are pluggable into the silos 152. The terminal cover seal 250 engages the housing 110 in the silo 152 to seal the terminal cover 202 to the housing 110. The cable seal 260 is provided inside the bore 212 to seal the cover body 210 to the cable 122.

In an exemplary embodiment, the housing 110 includes a step 158 at a front of the silo 152. The terminal channel 116 is stepped down at the step 158 (for example, smaller diameter). In an exemplary embodiment, the flange 165 of the terminal 120 faces the step 158. The flange 165 may engage the step 158 in the fully loaded position. The terminal seal 167 engages the housing 110 in the stepped down portion of the terminal channel 116 for sealing the terminal 120 to the housing 110.

The silo 152 includes the latching shoulder 154 extending along an exterior portion of the silo 152. The locating surface 237 at the base 236 of the latch 230 interfaces with the latching surface 154 to locate (for example, rotationally position) the terminal cover 202 relative to the housing 110. For example, the planar locating surface 237 engages the planar latching shoulder 154 to prevent rotation of the terminal cover 202 relative to the housing 110.

The latch 230 is used to latchably couple the terminal assembly 200 to the housing 110. The latch 230 is latchably coupled to the latching feature 156 in the fully mated position (FIGS. 8 and 9). For example, the latching finger 240 is latchably coupled to the latching feature 156 in the fully mated position. In an exemplary embodiment, the latching feature 156 includes a ramp surface 157 and a catch surface 159. As the terminal cover 202 is plugged onto the silo 152, the latching finger 240 rides up the ramp surface 157 to pass over the latching feature 156 and engage the catch surface 159 of the latching feature 156. The opening 244 receives the latching feature 156 and the connecting member 246 is located forward of the latching feature 156 to secure the latching finger 240, and thus the terminal cover 202, to the latching feature 156, and thus the housing 110. In alternative embodiments, the ramp and catch feature may be provided on the latch 230 of the terminal assembly 200 and the deflectable latching feature is provided on the silo 152.

The TPA device 270 is coupled to the base 236 of the latch 230. The TPA device 270 is slidable relative to the base 236 between a retracted position (FIG. 8) and an advanced position (FIG. 9). The TPA device 270 is used to assure that the terminal assembly 200 is properly and fully mated with the housing 110. The TPA device 270 may be used as a secondary lock, such as to lock the latching finger 240 in a latched position. The TPA device 270 includes a main body 272, a handle 274 extending from the main body 272, and a TPA finger 276 extending from the main body 272. The main body 272 is coupled to the base 236 and is slidable relative to the base 236, such as in a track formed in the base 236. The handle 274 extends through the hood 238 and may be accessed by the operator to push or pull on the TPA device 270 to move the TPA device 270 between the retracted position and the advanced position.

In the retracted position (FIG. 7), the TPA finger 276 is located in the opening 244. The connecting beam 246 blocks forward movement of the TPA finger 276 to the advanced position. As such, the TPA device 270 is unable to move from the retracted position to the advanced position when the TPA finger 276 is in the opening 244. When the terminal cover 202 is in the fully mated position (FIG. 8), the distal end of the TPA finger 276 is aligned with the latching feature 156. The latching finger 156 pushes the TPA finger 276 upward to a clearance position. The TPA finger 276 is no longer in the opening 244 and thus no longer blocked by the connecting beam 246. The TPA device 270 is free to move from the retracted position (FIG. 8) to the advanced position (FIG. 9). In the advanced position, the TPA finger 276 is used to block the latching finger 240 and thus lock the latching finger 240 in the latched position. The TPA finger 276 thus operates as a secondary lock.

The terminal assembly 200 is coupled to the housing 100 from the rear side of the housing 110. The terminal assembly 200 may be independently removed from the housing 110, such as for repair or replacement of the terminal 120. The housing 110 does not include internal latching features, such as within the interior of the terminal channel 116, that interface with the terminal 120 which is typical of conventional charging inlet assemblies. Such internal latching features require space (for example, lengthening of the terminal channel and of the terminal) for the latching. The charging inlet assembly 100 eliminates such internal latching features of the housing and of the terminal to decrease the overall length of the terminal and the length of the terminal channel. As such, the charging inlet assembly 100 has a low profile compared to conventional charging inlet assemblies. The charging inlet assembly provides the latching features at the exterior of the housing 110 allowing access to such latching components form the exterior of the housing 110 at the rear, reducing the complexity of the assembly and disassembly processes.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A terminal assembly for a charging inlet assembly, the terminal assembly comprising:
a terminal cable having a conductor;
a terminal having a pin at a mating end and a terminating end opposite the mating end terminated to the conductor at an end of the terminal cable; and
a terminal cover having a cover body including a bore that receives the terminating end of the terminal and the end of the terminal cable, the terminal cover including a latch configured to secure the terminal and the terminal cable to a housing of the charging inlet assembly, the terminal cover including a terminal cover seal at an exterior of the cover body configured to be sealed to the housing of the charging inlet assembly.

2. The terminal assembly of claim 1, wherein the cover body is cylindrical having an outer surface, the terminal cover seal being sealed to the outer surface.

3. The terminal assembly of claim 1, wherein the terminal cover includes a cable seal in the bore sealingly coupled to the terminal cable.

4. The terminal assembly of claim 3, wherein the cable seal is co-molded with the terminal cover seal.

5. The terminal assembly of claim 3, wherein the terminal cover includes seal channels through the cover body, the cable seal being co-molded with the terminal cover seal in situ on the cover body through the seal channels.

6. The terminal assembly of claim 1, wherein the cover body and the latch are co-molded as an integral, unitary structure.

7. The terminal assembly of claim 1, wherein the terminal cover includes a terminal blocking surface, the terminal blocking surface being coupled to the terminal to axially fix the terminal to the terminal cover.

8. The terminal assembly of claim 1, wherein the terminal includes a flange between a forward portion and a rearward portion of the terminal, the forward portion including a pin forward of the terminal cover, the terminal cover covering the rearward portion, the terminal cover including a terminal blocking surface at a front edge of the cover body, the terminal blocking surface engaging the flange to axially fix the terminal to the terminal cover.

9. The terminal assembly of claim 1, wherein the latch includes a latch block extending from the cover body and a latching finger extending from the latch block, the latch block configured to be coupled to the housing of the charging inlet assembly, the latching finger being latchably coupled to a latching feature of the housing.

10. The terminal assembly of claim 9, wherein the terminal cover includes a terminal position assurance (TPA) device coupled to the latch block, the TPA device being movable between a retracted position and an advanced position, the TPA device assuring the latching finger is fully latched to the housing when the TPA device is moved to the advanced position.

11. The terminal assembly of claim 10, wherein the TPA device blocks the latching finger from unlatching in the advanced position.

12. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a rear cavity at the rear;
DC terminals received in the corresponding DC terminal channels for mating with the DC charging connector;
AC terminals received in the corresponding AC terminal channels, each AC terminal including a pin at a mating end for mating with the AC charging connector, each AC terminal including a terminating end opposite the mating end terminated to a conductor at an end of a terminal cable; and terminal covers coupled to the AC terminals, each terminal cover having a cover body including a bore that receives the terminating end of the corresponding terminal and the end of the corresponding terminal cable, the terminal cover including a latch coupled to the rear of the housing to secure the terminal and the terminal cable to the housing, the terminal cover including a terminal cover seal sealed to the housing.

13. The charging inlet assembly of claim 12, wherein the housing includes silos at the rear forming the AC terminal channels, each silo including a latching feature, the latch coupled to the latching feature to latchably couple the terminal cover to the silo of the housing.

14. The charging inlet assembly of claim 12, wherein each AC terminal includes a terminal seal, the terminal seal being sealing coupled to the housing to seal between the AC terminal and the housing.

15. The charging inlet assembly of claim 12, wherein the cover body is cylindrical having an outer surface, the terminal cover seal being sealed to the outer surface.

16. The charging inlet assembly of claim 12, wherein the terminal cover includes a cable seal in the bore sealingly coupled to the terminal cable.

17. The charging inlet assembly of claim 12, wherein the latch includes a latch block extending from the cover body and a latching finger extending from the latch block, the latch block configured to be coupled to the housing of the charging inlet assembly, the latching finger being latchably coupled to a latching feature of the housing.

18. The charging inlet assembly of claim 12, wherein the terminal cover includes a terminal blocking surface, the terminal blocking surface being coupled to the terminal to axially fix the terminal to the terminal cover.

19. The charging inlet assembly of claim 18, wherein the TPA device blocks the latch from unlatching in the advanced position.

20. A charging inlet assembly comprising:

a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a rear cavity at the rear;

DC terminals received in the corresponding DC terminal channels for mating with the DC charging connector;

AC terminals received in the corresponding AC terminal channels, each AC terminal including a pin at a mating end for mating with the AC charging connector, each AC terminal including a terminating end opposite the mating end terminated to a conductor at an end of a terminal cable; and terminal covers coupled to the AC terminals, each terminal cover having a cover body including a bore that receives the terminating end of the corresponding terminal and the end of the corresponding terminal cable, the terminal cover including a latch coupled to the rear of the housing to secure the terminal and the terminal cable to the housing, the terminal cover including a terminal position assurance (TPA) device operably coupled to the latch and movable between a retracted position and an advanced position, the TPA device assuring the latch is fully latched to the housing when the TPA device is moved to the advanced position, the terminal cover including a terminal cover seal sealed to the housing.

* * * * *